United States Patent Office 3,784,510
Patented Jan. 8, 1974

3,784,510
NICKEL PYROLYZATE STABILIZERS FOR OLEFIN POLYMERS
Peter Kartschmaroff, Arlesheim, Basel-Land, Paul Moser, Basel, and Kurt Berger, Allschwil, Basel-Land, Switzerland, assignors to Ciba-Geigy Corporation, Ardsley, N.Y.
No Drawing. Original application July 16, 1970, Ser. No. 55,615, now Patent No. 3,660,444, dated May 2, 1972. Divided and this application Feb. 7, 1972, Ser. No. 224,291
Claims priority, application Switzerland, July 31, 1969, 11,650/69
Int. Cl. C08f 45/62
U.S. Cl. 260—45.75 N
6 Claims

ABSTRACT OF THE DISCLOSURE

Pyrolyzates are produced by heating the nickel salts of phosphonic acid semiesters. The obtained pyrolyzates are stabilizers for synthetic high-molecular materials.

---

This application is a divisional of copending application Ser. No. 55,615, filed July 16, 1970, now U.S. Pat. 3,660,444.

DESCRIPTION OF THE INVENTION

The present invention relates to a process for the production of pyrolyzates of nickel salts of phosphonic acid semiesters, to their use for the stabilizing of synthetic polymers, and to the polymers stabilized therewith.

The use of nickel salts of certain phosphonic acid semiesters as stabilizers in polymeric materials is known from the U.S. Pat. 3,310,575. The polymers into which such nickel salts have been incorporated exhibit a good stability, e.g. to light and to the action of heat, and also improved dyeability. However, the incorporation of these salts into the polymeric materials does have disadvantages, in that the master batches advantageously used for this incorporation may only contain a limited amount of nickel salts, so that no undesired evolution of gas occurs as a result of splitting-off volatile substances, such as water, alcohols, etc.

The process according to the invention enables stabilizers to be obtained which render possible the production of concentrated, usable master batches and which, after incorporation into the polymers, are moreover more stable to extraction than the prior known non-pyrolyzated nickel phosphonates.

It is characterized in that a compound of Formula I:

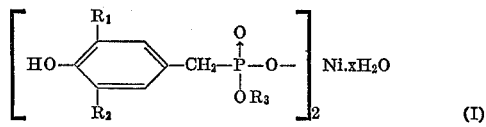

(I)

wherein $R_1$, $R_2$ and $R_3$ represent, independently of each other, an alkyl group having 1 to 5 carbon atoms, such as methyl, ethyl, propyl, butyl or aryl, or
$R_1$ and $R_2$ also represent the 1-methylcyclohexyl group, and
$x$ represents 0.5 to 3, is heated to 160 to 300° C., and the constituents volatile at this temperature are removed.

The groups $R_1$ and $R_2$ are, for example, α-branched alkyl groups such as iso-propyl or tert.butyl and, advantageously, at least one of them is the tertiary butyl group; $R_1$ and $R_2$ preferably represent the tertiary butyl group.

With regard to the water molecules which the starting compound contains in an $x$-fold amount, it is a case of crystal water and solvate water, which is not bound in a stoichiometrical manner to the nickel compound; $x$ thus represents a mean value which can be analytically determined.

The starting materials can be obtained in the known manner which is given in the above stated U.S. patent. A far more simple manner of obtaining them is by starting with diesters of Formula II:

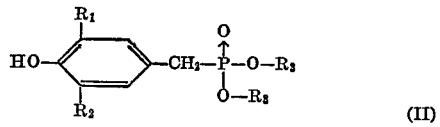

(II)

wherein the radicals $R_1$, $R_2$ and $R_3$ have the same meanings as given in Formula I; saponifying these in an aqueous medium with sodium or potassium hydroxide solution to give the monosodium salt or monopotassium salt of the corresponding monoester; neutralizing or slightly acidifying the reaction mixture after saponification; and thereupon adding an aqueous solution of a nickel salt. The nickel salt of the monoester then precipitates out in crystalline form.

According to the invention, the starting materials are heated to 160 to 300° C., whereby volatile constituents, consisting mainly of water and of the alcohol component of the respective semiester, split off. The pyrolysis process can be thereby clearly observed and progressively assessed. The degree of pyrolysis, i.e. the amount of volatile cleavage products, can vary within wide limits, without the effectiveness of the products being impaired as a result. The higher the temperature chosen, the shorter is, in general, the reaction time; this is, e.g. at 270–300° C. about 10–40 minutes; at 240° C. it is about three hours. It is, of course, necessary to take into account, with high temperatures, a series of secondary reactions which are not always desired, particularly when the temperature is raised to a high level immediately at the commencement of pyrolysis. Preferably, heating is initially kept below 200° C., e.g. at 170° C., and the temperature then gradually raised, e.g. to 230° C. If temperatures below 200° C. are used, then the reaction time is correspondingly longer.

The reaction may be carried out either with or without solvent. Suitable organic solvents are inert solvents, e.g. white oil or diphenyl ether.

The pyrolysates obtained according to the invention are good stabilisers for synthetic high-molecular materials, e.g. for polymers (solid at room temperature) made from α-olefins having 2 to 5 carbon atoms; especially for polypropylene. They protect these materials, e.g. against decomposition under the action of light, heat and oxygen. They can be used to produce synthetic-material-mixtures having high concentrations—so-called master-batches. In spite of the brown-yellow color of the pyrolyzates, these impart to the substrates a bottom color which is lighter than that imparted by the light-green starting materials. Synthetic-material-mixtures with the pyrolyzates undergo, moreover, practically no discoloration (or only a very slight amount) at elevated temperatures, or in boiling water. Furthermore, the pyrolyzates in the therewith treated substrates are more resistant to extraction with solvents than are the starting products.

The temperatures are given in degrees centigrade in the following examples.

Example 1

The nickel salt of 3,5-di-tert.butyl-4-hydroxybenzyl-phosphonic acid monomethyl ester is applied, in a ca. 5 mm. thick layer, to a heating surface, and the temperature of this is maintained for 1½ hours at 240°, whereby a weak stream of nitrogen is passed through the reaction vessel. The sintered mass is then cooled in the nitrogen stream and, with the exclusion of moisture, ground. A yellow-brown powder is obtained which is readily soluble in organic solvents, and which can be easily incorporated into polyolefins.

A preparation having properties corresponding to a great extent to those of the described product, the pyrolysis of which has, however, advanced somewhat further, is obtained by proceeding as above, but applying a heating-surface temperature of 280°.

The starting product is produced according to the following prescription: 34.2 g. (0.1 mole) of 3,5-di-tert. butyl-4-hydroxybenzylphosphonic acid dimethyl ester are suspended, in a pressure vessel, in 40 ml. of water and 22.4 g. of 30% potassium hydroxide solution (0.12 mole). This mixture is heated, under nitrogen, until an excess pressure of 1.8 to 2.0 atm. is attained, which corresponds to a temperature of 125–130°. This pressure is maintained for 5 hours by heat being supplied. After dilution with 60 ml. of water, the pH-value of the reaction mixture is lowered to 6.0 by the addition of ca. 2.4 g. of 30% hydrochloric acid; and the solution is then cleared by filtration. A solution of 11.9 g. (0.05 mole) of nickel chloride hexahydrate in 6 ml. of water is added dropwise at 35–40°, in the course of one hour, to the filtrate containing the potassium salt of 3,5-di-tert.butyl-4-hydroxybenzylphosphonic acid monomethyl ester; and the thereby formed crystalline suspension is afterwards stirred at the same temperature for half an hour. The mother liquor is separated by centrifuging; the precipitate is washed with 25 ml. of water; and the blue-green product is subsequently dried at a pressure of 11 mm. Hg at 70–80°, until constant weight is attained. A yellow powder is obtained, the elementary composition of which corresponds to that of a nickel salt (still containing 2–4% water) of the above stated semiester. The yield is 95% of the theoretical value.

Example 2

By starting with the nickel salt of 3,5-di-tert.butyl-4-hydroxybenzylphosphonic acid monoethyl ester, but otherwise proceeding as described in Example 1, a product is obtained possessing very similar properties to those of the pyrolysis product from Example 1, and which is suitable, in the same manner, for incorporation into polyolefins.

A product having properties corresponding substantially to those of the described preparation, the pyrolysis of which, however, has advanced somewhat further, is obtained by proceeding as described in Example 1, but applying a heating-surface temperature of 280°.

The starting product is produced according to the following prescription: 35.6 g. (0.1 mole) of 3,5-di-tert. butyl-4-hydroxybenzylphosphonic acid diethyl ester are suspended, in a pressure vessel, in a mixture of 16 g. of 30% sodium hydroxide solution (0.12 mole) and 40 ml. of water. The mixture is then heated, under nitrogen, until an excess pressure of 1.8 to 2.0 atm. obtains, corresponding to a temperature of 125–130°. This pressure is maintained for 5 hours by heat being supplied. After dilution with 60 ml. of water, the pH-value of the reaction mixture is lowered to 6.0 by the addition of ca. 2.4 g. of 30% hydrochloric acid; and the solution is cleared by filtration. To the filtrate containing the sodium salt of 3,5-di-tert.butyl-4-hydroxybenzylphosphonic acid monoethyl ester is added dropwise at 35–40°, in the course of one hour, a solution of 11.9 g. (0.05 mole) of nickel chloride hexahydrate in 6 ml. of water; and the thereby formed crystalline suspension is subsequently stirred for half an hour at the same temperature. The mother liquor is separated by centrifuging; the blue-green precipitate is washed with 25 ml. of water and dried under a pressure of 11 mm. Hg at 70–80°, until the weight remains constant. A yellow powder is obtained, the elementary composition of which corresponds to that of a nickel salt (still containing 2–4% water) of the above stated semiester. The yield is 95% of the theoretical value.

Example 3

By starting with the nickel salt of 3,5-di-tert.butyl-4-hydroxybenzylphosphonic acid mono-n-butyl ester, but otherwise proceeding as described in Example 1, a product is obtained which possesses very similar properties to those of the pyrolysis product from Example 1; and which is suitable, in the same manner, for incorporation into polyolefins.

A product having properties corresponding, to a great extent, to those of the described preparation, the pyrolysis of which, however, has advanced somewhat further, is obtained by proceeding as described in Example 1, but applying a heating-surface temperature of 280°.

The starting product may be produced according to U.S. 3,310,575 (Example 4), or according to the following process: 35.6 g. (0.1 mole) of 3,5-di-tert.butyl-4-hydroxybenzylphosphonic acid mono - n- butyl ester are dissolved in 100 ml. of ethanol and converted, by the addition of 10 ml. of a 10-n. aqueous sodium hydroxide solution, into the monosodium salt. To this solution are added dropwise 11.8 g. (0.05 mole of nickel chloride hexahydrate in 40 ml. of ethanol, whereby a sodium chloride suspension is formed, which is heated for half an hour to 55°.

At the same temperature, 170 ml. of water are added dropwise and the emulsion, thereby formed after the dissolving of the suspension, is stirred, with slow cooling, until a crystalline precipitate occurs. It is filtered off under suction, washed with 10% ethanol until free of sodium chloride, and then dried at 80° and under a pressure of 11 mm. Hg for 20 hours.

Example 4

10 g. of the nickel salt of 3,5-di-tert.-butyl-4-hydroxybenzylphosphonic acid monoethyl ester are suspended in 120 ml. of diphenyl ether, and the mixture is stirred under nitrogen for one hour at 230°, whereby the nickel phosphonate dissolves. This solution is concentrated by the crystallizing out of the diphenyl ether at −80°, and the residual diphenyl ether is removed by sublimation in vacuo (0.1 mm. Hg) with a bath temperature of 80–90°. After grinding of the residue, a yellow-brown product is obtained which is readily soluble in organic solvents, and which can be easily incorporated into polyolefins.

By starting with the nickel salt of 3,5-di-tert.butyl-4-hydroxybenzylphosphonic acid monomethyl ester, or with the nickel salt of 3,5-di-tert.-butyl-4-hydroxybenzylphosphonic acid mono-n-butyl ester, but otherwise proceeding as described in this example, pyrolyzates are obtained, the properties of which substantially correspond with those of the product described in this example.

Example 5

40 g. of polypropylene are plasticized in a roller-kneader at 200°, and simultaneously homogenized for 10 minutes with 200 mg. of pyrolyzate produced according to Example 2. From the synthetic-material-mass, 1 mm. thick plates are pressed in a hydraulic press at 200°.

The resistance to heat-ageing of the polypropylene plates stabilized with the pyrolyzate was determined in an air-circulation furnace. As a control, parallel tests were carried out on specimens which had been produced without the addition of pyrolyzates, but otherwise under the same conditions. In the following table, the time in hours is given which was required to produce embrittlement or decomposition of the specimens.

RESISTANCE TO HEAT-AGEING IN THE AIR-CIRCULATION OVEN

| Test temperature | 149° | 135° |
|---|---|---|
| Stabilized with the pyrolyzate, hours | 450 | 2,900 |
| Control, hours | 20 | 110 |

The color and color-stability of the plate-specimens stabilized with the pyrolyzate was assessed at 200° pressing-temperature, as well as after 5 days oven-ageing, and also after 7 days boiling in distilled water, the assessment being made with the aid of a color-scale, according to which 1 represents the greatest degree of discoloration and 5 the lowest degree. As a control, specimens were assessed which contained as stabilizer, instead of the pyrolyzate, the corresponding non-pyrolyzated nickel phosphonate, but which had otherwise been produced under the same conditions.

COLOR ASSESSMENT

|  | Press. temperature 200° | After 5 days oven-ageing | After 7 days boiling |
|---|---|---|---|
| Stabilized with the pyrolyzate | 3-4 | 1-2 | 3-4 |
| Control, stabilized with the non-pyrolyzated nickel phosphonate | 2-3 | <1 | 2-3 |

Example 6

Polypropylene is processed, as described in Example 5, with the pyrolyzate produced according to Example 3; and it is then pressed at 200° into plates or into sheets.

Color and color-stability of the stabilized polypropylene plates are determined as in Example 5.

COLOR ASSESSMENT

|  | Press temperature, 200° | After 5 days oven-ageing | After 7 days boiling |
|---|---|---|---|
| Stabilized with the pyrolyzate | 4 | 1-2 | 4 |
| Control, stabilized with the non-pyrolyzated nickel phosphonate | 1-2 | <1 | 1-2 |

The extraction-stability of the pyrolyzate in polypropylene sheets was tested in comparison with the non-pyrolyzated nickel phosphonate which, in itself, has good compatibility in polypropylene.

EXTRACTION-STABILITY MEASURED ON 0.3 MM. THICK POLYPROPYLENE SHEETS

| Extraction time | 30 minutes | 200 minutes |
|---|---|---|
| Stabilized with the pyrolyzate | 12 | 26 |
| Control, stabilized with the non-pyrolyzated nickel phosphonate | 24 | 49 |

NOTE.—Extraction conditions: 500 mg. of sheet in 24 ml. of CHCl₃ at room temperature. Determination of the extracted amount of stabilizer by means of spectrophotometric measurement of the residual concentration in the sheet. The values given represent the loss in percent of the initial concentration.

It is shown that the pyrolyzate is appreciably more stable to extraction than the corresponding non-pyrolyzated nickel phosphonate.

Example 7

100 parts of polypropylene are homogenized for 10 minutes at 185–195° on a friction roll mill, with 0.5 part by weight of pyrolyzate produced according to Example 2. From the rolled sheet are pressed, in a hydraulic press at 300°, 1 mm. thick plates.

The color of the plates, assessed according to Example 5, is 3, whilst the control specimens, stabilized with the non-pyrolyzated nickel phosphonate, give the color-value 1–2.

Similar results are obtained when polyethylene is used instead of polypropylene.

Example 8

Polypropylene is processed, as described in Example 7, with the pyrolyzate produced according to Example 3; and it is then pressed out at 300° into 1 mm. thick plates or 0.3 mm. thick sheets.

The color of the plates, assessed according to Example 5, is 3, whereas the control specimens, stabilized with the non-pyrolyzated nickel phosphonate, give the color-value 1–2.

The extraction-stability of the pyrolyzate in the polypropylene sheet, determined according to Example 6, is as follows:

EXTRACTION-STABILITY

| Extraction time | 30 minutes | 200 minutes |
|---|---|---|
| Stabilized with the pyrolyzate | 13 | 27 |
| Control, stabilized with the non-pyrolyzated nickel phosphonate | 27 | 43 |

Example 9

100 parts by weight of polypropylene flakes are impregnated with 1.0 part by weight of pyrolyzate produced according to Example 4. This material is extruded on a screw press with a temperature pattern up to 275°, and then granulated.

The thus obtained granulate is extruded and granulated 5 times in succession under the same conditions, i.e. at 275°. The melting index, afterwards determined according to ASTM D 1238, is 5. The sample melted under the same conditions, but containing no pyrolyzate, gave, with the same test, a melting index of 15.

Example 10

100 parts by weight of polypropylene are processed with 10 parts by weight of pyrolyzate, produced according to Example 3, on a Co-kneader at 240° into a master batch. No disturbing secondary effects, such as foaming up or bubble formation, can thereby be observed.

In contrast to this, the production of such a master batch using non-pyrolyzated nickel phosphonate, under otherwise the same condiitons, is not possible, since the split off volatile constituents cause an excessive swelling up of the material and lead to inhomogeneity of the mass.

Example 11

100 parts by weight of polypropylene (fibre grade) are pre-homogenized and granulated with 0.1 part by weight of phenolic antioxidant and 0.5 part by weight of pyrolyzate produced according to Example 2. This granulate is processed on a melt-spinning machine at 265° into multifilaments, and afterwards further drawn, in the ratio 1:4, over a heating-block at 160°. The total degree of stretching thus attained is 1:8. The titre of the polypropylene fibres obtained in this manner is 130 den. The resistance to heat-ageing of the polypropylene multifilament stabilized with the pyrolyzate, determined in an air-circulation oven at 135° according to Example 5, is 80 hours, whilst that of a multifilament produced without the addition of pyrolyzate, but otherwise under the same conditions, amounts to only 4 hours.

The fastness to light of the polypropylene multifilament stabilized with the pyrolyzate was determined in the Xenotest 150 apparatus. As a control, a multifilament was tested which had been produced under the same conditions, but which contained no pyrolyzate stabilizer. As a measure of the service-life of the material, the time in hours is given at which the ultimate tensile strength of the multifilaments has decreased to 50% of the initial value.

Fastness to light in the Xenotest 150

|  | Hours |
|---|---|
| Stabilized with the pyrolyzate | 1700 |
| Control | 550 |

Example 12

100 parts by weight of polypropylene powder are homogenized with 0.1 part by weight of phenolic antioxidant and with 0.5 part by weight of pyrolyzate produced according to Example 3; and the mixture is then extruded at 240° through a slot die. The cooled extruded material is afterwards passed continuously through a heating-channel at 130 to 180°, and simultaneously drawn out in the ratio 1:12. The thickness of the thus obtained tapes is 0.06 mm.

The resistance to heat-ageing of the polypropylene sheet tapes stabilized with the pyrolyzate, determined in the air-circulation oven at 135°, according to Example 5, is 850 hours; whilst that of sheet tapes produced without the addition of pyrolyzate, but otherwise under the same conditions, amounts to only 60 hours.

The fastness to light of the sheet tapes, tested in the Xenotest 150, according to Example 11, was 2050 hours; whereas the fastness to light of the sheet tapes without addition of pyrolyzate was only 910 hours.

What we claim is:

1. An α-olefin polymer composition stabilized with a solid yellow or yellow-brown pyrolyzate of a nickel salt of a phosphonic acid semi-ester, said pyrolyzate being prepared by a process comprising heating in an inert atmosphere to 160–300° C. of a compound having the formula

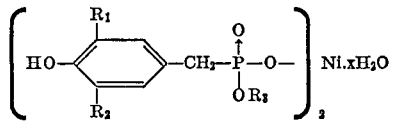

wherein $R_1$, $R_2$ and $R_3$ are, independently of each other, alkyl groups having 1 to 5 carbon atoms, or when $R_1$ and $R_2$ are taken together, 1-methylcyclohexyl group, and $x$ is a value from 0.5 to 3, and removing the constituents which are volatile at said temperature.

2. A composition of claim 1 wherein said polymer is polypropylene.

3. A composition of claim 1 wherein $R_1$ and $R_2$ are α-branched alkyl groups.

4. A composition of claim 3 wherein at least one of $R_1$ and $R_2$ is tert.-butyl group.

5. A composition of claim 3 wherein $R_1$ and $R_2$ are tert.-butyl groups.

6. A composition of claim 5 wherein the polymer is polypropylene.

References Cited
UNITED STATES PATENTS 3,310,575   3/1967   Spivack _____ 260—45.75

DONALD E. CZAJA, Primary Examiner

V. P. HOKE, Assistant Examiner